US006983799B2

(12) United States Patent
Reddy et al.

(10) Patent No.: US 6,983,799 B2
(45) Date of Patent: *Jan. 10, 2006

(54) METHOD OF USING A SWELLING AGENT TO PREVENT A CEMENT SLURRY FROM BEING LOST TO A SUBTERRANEAN FORMATION

(75) Inventors: B. Raghava Reddy, Duncan, OK (US); Frank Zamora, Duncan, OK (US); James J. Venditto, Ruwi (OM); Robert J. Sepulvado, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 136 days.

This patent is subject to a terminal disclaimer.

(21) Appl. No.: 10/375,206

(22) Filed: Feb. 27, 2003

(65) Prior Publication Data

US 2004/0168804 A1    Sep. 2, 2004

(51) Int. Cl.
    E21B 33/14    (2006.01)
    E21B 33/16    (2006.01)

(52) U.S. Cl. ............ 166/291; 166/291; 166/292; 166/294; 166/295; 166/300; 175/72; 507/113; 507/119; 507/140; 507/215; 507/225; 507/226; 507/269

(58) Field of Classification Search ........... 166/295, 166/294, 293, 292, 291, 300; 507/219, 225, 507/113, 119, 140, 215, 226, 269; 175/75, 175/72
See application file for complete search history.

(56) References Cited

U.S. PATENT DOCUMENTS

| | | | |
|---|---|---|---|
| 2,649,160 A * | 8/1953 | Krogh et al. ............ 166/292 |
| 2,848,051 A * | 8/1958 | Williams ............... 166/291 |
| 3,202,214 A | 8/1965 | McLaughlin Jr. ........ 166/30 |
| 3,302,717 A * | 2/1967 | West et al. ............. 166/283 |
| 3,306,870 A | 2/1967 | Eilers et al. |
| 3,376,926 A | 4/1968 | McLaughlin et al. ..... 166/29 |
| 3,447,608 A | 6/1969 | Fry et al. |
| 3,448,800 A | 6/1969 | Parker et al. |
| 3,818,998 A | 6/1974 | Hessert ................. 175/72 |
| 3,953,336 A * | 4/1976 | Daigle |
| 4,083,407 A | 4/1978 | Griffin, Jr. et al. ...... 166/291 |
| 4,172,066 A * | 10/1979 | Zweigle et al. ......... 523/223 |
| 4,282,928 A * | 8/1981 | McDonald et al. ....... 166/268 |
| 4,299,710 A * | 11/1981 | Dupre et al. |
| 4,466,831 A | 8/1984 | Murphey ............... 106/74 |
| 4,478,640 A * | 10/1984 | Holland |
| 4,515,216 A | 5/1985 | Childs et al. .......... 166/293 |
| 4,572,295 A * | 2/1986 | Walley ................. 166/295 |
| 4,579,668 A | 4/1986 | Messenger ........ 252/8.5 LC |
| 4,588,031 A * | 5/1986 | Oliver et al. ........... 166/291 |
| 4,664,816 A * | 5/1987 | Walker |
| 4,704,213 A * | 11/1987 | Delhommer et al. |
| 4,724,906 A * | 2/1988 | Sydansk ............... 166/295 |
| 4,730,674 A * | 3/1988 | Burdge et al. .......... 166/295 |
| 4,836,940 A | 6/1989 | Alexander |
| 4,941,533 A * | 7/1990 | Buller et al. .......... 166/252 |
| 5,086,841 A | 2/1992 | Reid et al. |
| 5,351,759 A | 10/1994 | Nahm et al. .......... 166/293 |
| 5,439,057 A * | 8/1995 | Weaver et al. ......... 166/295 |
| 5,550,189 A * | 8/1996 | Qin et al. ............. 525/54.3 |
| 5,735,349 A * | 4/1998 | Dawson et al. ........ 166/295 |
| 6,218,343 B1 * | 4/2001 | Burts, Jr. ............. 507/225 |
| 6,508,306 B1 | 1/2003 | Reddy et al. .......... 166/295 |
| 6,581,701 B2 * | 6/2003 | Heying ................ 175/72 |
| 6,767,867 B2 | 7/2004 | Chatterji et al. ....... 507/216 |
| 6,777,377 B2 | 8/2004 | Myers et al. .......... 507/120 |
| 2002/0188040 A1 | 12/2002 | Chen et al. ........... 524/35 |
| 2003/0008779 A1 | 1/2003 | Chen et al. ........... 507/200 |
| 2004/0168798 A1 | 9/2004 | Creel et al. ........... 166/270 |
| 2004/0168802 A1 | 9/2004 | Creel et al. ........... 166/293 |
| 2004/0168804 A1 | 9/2004 | Reddy et al. .......... 166/295 |

FOREIGN PATENT DOCUMENTS

| WO | WO 2004/101463 A2 | 11/2004 |
|---|---|---|
| WO | WO 2004/101463 A3 | 11/2004 |
| WO | WO 2004/101951 A1 | 11/2004 |
| WO | WO 2004/101952 A1 | 11/2004 |

OTHER PUBLICATIONS

Baroid brochure entitled "Hydro-Plug™ Lost Circulation Plug" dated 2002.*
U.S. Appl. No. 10/970,444, filed Oct. 20, 2004, Entitled "Methods of Using a Swelling Agent In a Wellbore", Prentice G. Creel et al.*
Baroid brochure entitled "Diamond Seal™" dated 1998.
Foreign communication from a related counterpart application dated Jul. 12, 2004.
Office Action dated Apr. 19, 2005 of related Appl. No. 10/375,183, 11 pgs.

* cited by examiner

Primary Examiner—George Suchfield
(74) Attorney, Agent, or Firm—Craig W. Roddy; Conley, Rose P.C.

(57) ABSTRACT

Methods of cementing in a subterranean formation include passing a swelling agent to a permeable zone in a subterranean formation. The swelling agent is combined with a carrier fluid before being passed to the permeable zone. Upon contacting an aqueous fluid, the swelling agent swells in the permeable zone. The aqueous fluid may already be present in the subterranean formation, or alternatively, it may be introduced to the subterranean formation after passing the swelling agent into the subterranean formation. The swelling agent substantially inhibits a cement slurry subsequently pumped into the subterranean formation from passing through the permeable zone. The cement slurry therefore continues flowing down through the casing and up through the annulus where it sets and forms a strong cement column.

27 Claims, No Drawings

METHOD OF USING A SWELLING AGENT TO PREVENT A CEMENT SLURRY FROM BEING LOST TO A SUBTERRANEAN FORMATION

CROSS-REFERENCE TO RELATED APPLICATIONS

Related applications are U.S. patent application Ser. No. 10/375,183 filed on Feb. 27, 2003 and entitled "Compositions and Methods of Cementing in Subterranean Formations Using a Swelling Agent to Inhibit the Influx of Water into a Cement Slurry" and U.S. patent application Ser. No. 10/375,205 filed on Feb. 27, 2003, now U.S. Pat. No. 6,889,766, and entitled "Methods of Passing a Swelling Agent into a Reservoir to Block Undesirable Flow Paths During Oil Production," each of which is incorporated by reference herein in its entirety.

FIELD OF THE INVENTION

This invention generally relates to well cementing. More specifically, the invention relates to introducing a swelling agent to a subterranean formation to seal permeable zones therein, thereby preventing a cement slurry from being subsequently lost to the subterranean formation.

BACKGROUND OF THE INVENTION

Well cementing is a process used in penetrating subterranean formations that produce oil and gas. In well cementing, a well bore is drilled while a drilling fluid is circulated through the well bore. The circulation of the drilling fluid is then terminated, and a string of pipe, e.g., casing, is run in the well bore. The drilling fluid in the well bore is conditioned by circulating it downwardly through the interior of the pipe and upwardly through the annulus, which is located between the exterior of the pipe and the walls of the well bore. Next, primary cementing is typically performed whereby a slurry of cement in water is placed in the annulus and permitted to set, i.e., harden into a solid mass, to thereby attach the string of pipe to the walls of the well bore and seal the annulus. Subsequent secondary cementing operations, i.e., any cementing operation after the primary cementing operation, may also be performed. One example of a secondary cementing operation is squeeze cementing whereby a cement slurry is forced under pressure to areas of lost integrity in the annulus to seal off those areas.

One problem commonly encountered during primary cementing is the presence of one or more permeable zones in the subterranean formation. Such permeable zones result in the loss of at least a portion of the cement slurry to the subterranean formation as the slurry is being pumped down through the casing and up through the annulus. Due to such loss, an insufficient amount of the slurry passes above the permeable zones to fill the annulus from top to bottom. Further, dehydration of the cement slurry may occur, compromising the strength of the cement that forms in the annulus. The permeable zones may be, for example, depleted zones, zones of relatively low pressure, lost circulation zones having naturally occurring fractures, weak zones having fracture gradients exceeded by the hydrostatic pressure of the cement slurry, or combinations thereof. In some cases, the weak zones may contain pre-existing fractures that expand under the hydrostatic pressure of the cement slurry.

Traditional methods of overcoming the above described problem include sealing the permeable zones using thixotropic cements, non-aqueous dispersions of clays, sodium silicate solutions in combination with calcium salt sweeps, or well fluids containing inert platelets such as mica or Cellophane™. Unfortunately, the use of some of these materials can contaminate fresh water in the subterranean formation. Such fresh water is often encountered when drilling for oil or gas and may be a source of water for animals and humans. Another limitation of these materials is that they either fail to adequately plug or are slow to form plugs in permeable zones that expand in size due to, for example, the hydrostatic pressure of the cement slurry. A need therefore exists to develop a method of inhibiting a cement slurry from migrating through permeable zones in a subterranean formation even if those zones expand and without risking the contamination of water in the formation.

SUMMARY OF THE INVENTION

Methods of cementing in a subterranean formation include passing a swelling agent to a permeable zone in a subterranean formation. The swelling agent is combined with a carrier fluid before being passed to the permeable zone. Upon contacting an aqueous fluid, the swelling agent swells in the permeable zone. The aqueous fluid may already be present in situ within the subterranean formation, or alternatively, it may be introduced to the subterranean formation after passing the swelling agent into the subterranean formation, for example by pumping from the surface. The swelling agent substantially inhibits a cement slurry subsequently pumped into the subterranean formation from passing through the permeable zone. The cement slurry therefore continues flowing down through the casing and up through the annulus where it sets and forms a strong cement column.

Optionally, a silicate solution comprising sodium or potassium salts, or both may be combined with the swelling agent prior to passing the swelling agent to the permeable zone. The silicate salt solution may contain an acid generating gelling agent or may be contacted with a calcium salt gelling agent to cause a gel to form, thereby strengthening the swelling agent or the entire treatment composition.

DETAILED DESCRIPTION OF THE PREFERRED EMBODIMENTS

Well cementing methods are performed in which an effective amount of one or more swelling agents is passed into a well bore ahead of a cement slurry to plug permeable zones in the subterranean formation penetrated by the well bore. The swelling agent thus prevents the cement slurry from escaping from the well bore and becoming lost to the subterranean formation as the slurry is pumped into the well bore. Thus, the hydrostatic pressure of the cement slurry is maintained such that the slurry returns to the surface of the well bore and forms a relatively strong cement column in the annulus of the well bore According to preferred embodiments, a primary cementing process is carried out according to standard well cementing practices. The primary cementing process includes drilling a well bore down to a subterranean formation while circulating a drilling fluid through the well bore. A string of pipe, e.g., casing, is then run in the well bore. The drilling fluid is conditioned by circulating it down through the interior of the pipe and up through the annulus. A preflush containing the swelling agent and a carrier fluid may then be displaced into the well bore to prepare the subterranean formation for cementing. In some embodiments, fresh water produced by the subterranean formation contacts the swelling agent downhole, causing it to swell and fill permeable zones in the subterranean formation. These permeable zones may be, for example, fractures, fissures, streaks, voids, and the like. In other embodiments, an aqueous fluid is pumped into the subterranean formation behind the swelling agent to cause the swelling agent to swell and fill the permeable zones. Thereafter, a cement slurry is pumped down through the interior of the pipe and up through the annulus in the well bore. The swelling agent substantially plugs the permeable zones in the subterranean formation through which the cement slurry could otherwise pass, thus inhibiting the slurry from exiting the well bore in an unintended direction.

As used herein, the swelling agent is defined as a material that absorbs water and swells (i.e., expands) as it absorbs the water. The swelling agent is preferably a cross-linked network of hydrophilic polymer with a high capacity for water absorption. The polymer material is in dehydrated solid form prior to use. The swelling agent is preferably insoluble in water and thus avoids becoming diluted and washed away by the water. It is also preferably non-toxic. As such, there is no need to be concerned that the swelling agent might contaminate any water present in the subterranean formation. Preferably, the swelling agent forms a gel mass upon swelling that can be effective for blocking flow paths of the cement slurry into the subterranean formation. A gel is herein defined as a crosslinked polymer network swollen in a liquid. In effect, the polymer undergoes a change from that of a dehydrated solid to that of a hydrated gel as it absorbs water. Once fully hydrated, the gel preferably exhibits a high resistance to the migration of a cement slurry therethrough. That is, the swollen particles of the gel are sufficiently packed together to substantially inhibit the cement slurry from passing through the gel. Further, the gel can withstand substantial amounts of pressure, e.g., the hydrostatic pressure of the cement slurry, without being dislodged or extruded.

The swelling agent may be, for example, a so-called superabsorbent commonly used in absorbent products such as horticulture, soil modification, diapers, training pants, and feminine care products. Superabsorbents comprise crosslinked polymers having charged pendant groups. Crosslinking chemicals tie the polymer chains together to form a three-dimensional network, enabling the superabsorbent to absorb water or water-based solutions into the spaces in the molecular network, thus forming a gel and locking up the liquid. Superabsorbents have the ability to absorb and store many times, e.g., 40 to 600 times, their own weight of water. The superabsorbents retain the liquid that they absorb and typically do not release the liquid, even under pressure. Preferred superabsorbents are crosslinked polyacrylamide; crosslinked polyacrylate; copolymers of acrylamide and acrylate monomers; polymers of two or more of allylsulfonate, 2-acrylamido-2-methyl-1-propanesulfonic acid, 3-allyloxy-2-hydroxy-1-propane-sulfonic acid, acrylamide, and acrylic acid monomers; a starch backbone grafted with acrylonitrile and acrylate; or combinations thereof. An example of a crosslinked polyacrylamide is DIAMOND SEAL polymer, which may be purchased from Baroid Drilling Fluids, Inc. The DIAMOND SEAL polymer possesses certain qualities that make it an exceptional swelling agent. For example, the DIAMOND SEAL polymer is water-insoluble and is resistant to deterioration by carbon dioxide, bacteria, and subterranean minerals. Further, the DIAMOND SEAL polymer can withstand temperatures up to at least 250° F. without experiencing breakdown and thus may be used in the majority of locations where well bores are drilled. An example of a biodegradable starch backbone grafted with acrylonitrile and acrylate is commercially available from Grain Processing Corporation of Muscantine, Iowa under the tradename WATER LOCK. Other examples of superabsorbents include crosslinked hydrolyzed polyacrylonitrile, carboxyalkyl cellulose, carboxyalkyl starch, salts of carboxyalkyl cellulose, carboxyalkyl polysaccharide, and combinations thereof. Additional compounds that may be used as swelling agents are described in European Patent No. 0566118, which is incorporated by reference herein.

As the swelling agent undergoes hydration, its physical size can increase up to 600 times its original volume. Thus, after the swelling agent migrates to a permeable zone in the subterranean formation, it initially absorbs a sufficient amount of the aqueous fluid to maintain the swelling agent in a compressed condition within the permeable zone. As a result, the swelling agent expands in response to any increases in the dimensions of the permeable zone, thus ensuring the zone remains plugged. Such increases in the size of the permeable zone could occur in response to the hydrostatic pressure of the cement slurry.

The amount and rate by which the swelling agent increases in size vary depending upon its temperature, its particle size, and the ionic strength of the aqueous fluid. The temperature of a well bore generally increases from top to bottom such that the rate of swelling increases as the swelling agent passes downhole. The rate of swelling also increases as the particle size of the swelling agent decreases and as the ionic strength of the aqueous fluid decreases. For example, the mass of a DIAMOND SEAL polymer having a 1.4 mm grind size increases by 0% in 20 minutes after contacting water at 80° F., 150% in 35 minutes after contacting the water, and 400% in 45 minutes after contacting the water. The mass of the DIAMOND SEAL polymer increases by 0% in 15 minutes after contacting water at 145° F., 200% in 25 minutes after contacting the water, and 400% in 35 minutes after contacting the water. The mass of the DIAMOND SEAL polymer increases by 0% in 45 minutes after contacting 9.2 pounds/gallon (ppg) brine water at 80° F., 25% in 60 minutes after contacting the brine water, and 50% in 75 minutes after contacting the brine water. The mass of the DIAMOND SEAL polymer increases by 0% in 30 minutes after contacting 9.2 ppg brine water at 145° F., 25% in 45 minutes after contacting the brine water, and 50% in 60 minutes after contacting the brine water. As used herein, the symbol % represents percent throughout the specification. Thus, when the well bore is relatively deep, a slower swelling rate of the swelling agent can be achieved by using larger particle sizes and/or by using a carrier fluid having a relatively high ionic strength.

In some embodiments, a blend of swelling agents having different rates of water absorption may be employed as a pre-flush of the cement slurry. For example, the blend of swelling agents may include swelling agents of different particle sizes. The swelling agents that swell at a slower rate can migrate deeper into the subterranean formation due to their smaller size, whereas the swelling agents that swell at a faster rate do not travel as far into the subterranean formation. Using the blend of swelling agents thus ensures that permeable zones at different depths of the formation are plugged. Further, using a wider range of particle sizes provides for a more tightly packed fill-in of the permeable zones.

The carrier fluid with which the swelling agent is combined may be any suitable fluid for moving the swelling agent to permeable zones in the subterranean formation. The carrier fluid is preferably a pumpable fluid that can hold the swelling agent in a stable suspension. To improve the suspending ability of the carrier fluid, viscosifying agents suitable for increasing the viscosity of the carrier fluid may be employed. Examples of such viscosifying agents include hydroxylethylcellulose, hydroxypropylcellulose, guar gum, hydroxyethyl- or hydroxypropyl-guar gum, etc. In preferred embodiments, the carrier fluid is a non-aqueous fluid, e.g., an organic solvent, or an aqueous fluid having a relatively high ionic strength, e.g., an aqueous solution containing greater than about 1 weight % salt per total weight of the aqueous solution. For example, the aqueous solution may be a saturated salt solution. The salt in the aqueous solution may be an alkaline earth metal salt ($CaCl_2$), an alkali metal salt (e.g., NaCl and KCl), or combinations thereof. By using a carrier fluid having a relatively high ionic strength, the swelling agent does not swell significantly until it contacts the aqueous fluid downhole. In this manner, the swelling of the swelling agent is delayed to allow the swelling agent to penetrate deeply in the permeable zones, thereby ensuring that the zones are effectively filled. In the aforementioned embodiments in which the aqueous fluid is introduced to the well bore after the introduction of the swelling agent, the aqueous fluid is preferably a fluid having a relatively low ionic strength such as fresh water or water having a low salt content. Accordingly, the swelling agent absorbs the aqueous solution and thus expands in size by an amount sufficient to plug the permeable zones.

The quantity of the swelling agent that may be combined with the carrier fluid depends on a number of factors, including the type of carrier fluid, the pumpability of the resulting composition, the volume capacities of the well bore's tubulars in conjunction with the placement rate logistical timing, the flow rate and the pressure of any water in the well bore, and diagnostics performed to define the apparent voidage or communicating areas. In general, the swelling agent may be present in the composition comprising the swelling agent and the carrier fluid in an amount ranging from about 0.5% to about 25% by weight of the composition, preferably from about 1% to about 10% by weight of the composition.

In another embodiment, the swelling agent is combined with a silicate solution comprising sodium silicate, potassium silicate, or both to form a composition for treating permeable zones in a subterranean formation. A gelling agent capable of causing the silicate solution to gel at the down hole temperature is also included in the composition. The gelling agent effectively lowers the pH of the silicate solution at the down hole temperature, causing silica gel or particles to form within the swelling agent, as well as in the surrounding matrix fluid, thereby increasing the strength of the composition. The matrix silica gel also assists the swelling agent in plugging the permeable zones in the subterranean formation. Examples of silicate solutions containing gelling agents having suitable gel times at different temperatures are INJECTROL silicate formulations, which can be purchased from Halliburton, Inc. Alternatively, the silicate solution containing the swelling agent, upon placement in a permeable zone, may be brought into contact with an aqueous calcium salt solution (a gelling agent), e.g., calcium chloride solution, to form an insoluble calcium silicate barrier in the permeable zone. In yet another embodiment, the silicate solution containing the swelling agent, upon placement in the permeable zone, may be brought into contact with the cement slurry itself during primary cementing. The calcium ions present in the hydrating cement slurry will react with silicate ions to form an insoluble calcium silicate barrier at the interface, thus further improving the effectiveness of the treatment by forming good adhesion between the ensuing cement column and the silicate solution containing the swelling agent. The loss of any filtrate from the slurry containing calcium ions into the permeable zone would further strengthen the plugging material by forming calcium silicate deposits.

According to some embodiments, a rapidly dissolvable powdered silicate comprising a mixture of sodium silicate and potassium silicate can be mixed with a fluid to form a silicate solution for incorporation in the swelling agent. The molar ratio of silicon dioxide to sodium oxide in the sodium silicate is in the range of from about 1.5:1 to about 3.3:1, and the molar ratio of silicon dioxide to potassium oxide in the potassium silicate is in the range of from about 1.5:1 to about 3.3:1. The powdered silicate is preferably partially hydrated to enable it to be dissolved rapidly. In particular, it may have a water content in the range of from about 14% to about 16% by weight of hydrated silicate.

Examples of gelling agents that may be used to activate or gel the silicate solutions include acids and chemicals that react in the presence of the silicate solution to lower the pH of the composition at wellbore temperatures. According to one embodiment, the gelling agents include, but not limited to, sodium acid pyrophosphate, lactose, urea, and an ester or lactone capable of undergoing hydrolysis in the presence of the silicate solution. In yet another embodiment, the gelling agent is a mixture of a reducing agent and an oxidizing agent capable of undergoing an oxidation-reduction reaction in the presence of the silicate solution. Suitable silicate solutions and gelling agents (or activators) are also disclosed in U.S. Pat. Nos. 4,466,831, 3,202,214, 3,376,926, 3,375,872, and 3,464,494, each of which is incorporated by reference herein in its entirety.

As deemed appropriate by one skilled in the art, additional additives may be combined with the swelling agent and the carrier fluid. For example, weighting materials, i.e., materials capable of increasing the density of the composition, may be combined with the swelling agent before passing it into the well bore.

The cement slurry introduced to the well bore comprises cement mixed with a sufficient amount of fluid to form a pumpable slurry. The cement may be, for example, a hydraulic cement composed of calcium, aluminum, silicon, oxygen, and/or sulfur which sets and hardens by reaction with water. Examples of hydraulic cements are Portland cements, pozzolan cements, gypsum cements, high alumina content cements, silica cements, and high alkalinity cements. The cement is preferably a Portland cement, more preferably a Class A, C, G, or H Portland cement, and most preferably a Class C or A Portland cement. The fluid mixed in the cement slurry is preferably fresh water or salt water, e.g., an unsaturated aqueous salt solution or a saturated aqueous salt solution such as brine or seawater.

EXAMPLES

The invention having been generally described, the following examples are given as particular embodiments of the invention and to demonstrate the practice and advantages hereof. It is understood that the examples are given by way of illustration and are not intended to limit the specification or the claims to follow in any manner.

Example 1

Several test samples were formed by mixing the DIAMOND SEAL polymer (DS) with the following aqueous solutions: fresh water (Sample 1); a fresh water solution containing 0.5 weight (wt.) % hydroxyethylcellulose (HEC) per total weight of the solution (Sample 2); a saturated NaCl solution containing 0.5 wt. % HEC and 37 wt. % NaCl per total weight of the solution (Sample 3); a $CaCl_2$ solution containing 33 wt. % $CaCl_2$ per total weight of the solution (Sample 4); a $CaCl_2$ solution containing 3.3 wt. % $CaCl_2$ per total weight of the solution (Sample 5); and a $CaCl_2$ solution containing 11 wt. % $CaCl_2$ per total weight of the solution (Sample 6). Some of the samples contained a neutral viscosifying agent, i.e., HEC, to suspend the DS particles in the aqueous solution, thus simulating the suspension of such particles in a carrier fluid being pumped into a well bore. The HEC used in this example was a Halliburton product known as FWCA. The size change of the DIAMOND SEAL particles in each sample was observed. In tap water, the DIAMOND SEAL particles increased from 2 mm to about 12 to 15 mm in the length of each side, assuming a cube like particle shape. For each test sample, the grams of aqueous solution absorbed per gram of DIAMOND SEAL polymer were determined after different intervals of time. As such, the rates of water absorption exhibited by the DIAMOND SEAL polymer in different aqueous solutions could be compared, as shown in Table 1 below.

TABLE 1

| Time (hrs.) | Absorption by Sample 1 (g solution/ g DS) | Absorption by Sample 2 (g solution/ g DS) | Absorption by Sample 3 (g solution/ g DS) | Absorption by Sample 4 (g solution/g DS) | Absorption by Sample 5 (g solution/g DS) | Absorption by Sample 6 (g solution/ g DS) |
|---|---|---|---|---|---|---|
| 0.25 | 17.5 |  | 5 | 0 |  |  |
| 0.5 | 28 |  | 8.4 | 0 |  |  |
| 1.0 | 44 |  | 10 | 0 | 10 | 2 |
| 1.5 | 67 | 65 | 13 | 0 |  |  |
| 2.5 | 87 |  | 16 | 0 |  |  |
| 3.5 |  |  |  |  | 16 | 7 |
| 72 |  |  | 40 | 0 |  |  |

The results show that the swelling rate of the DIAMOND SEAL polymer is affected by the salt concentration and the salt type of the aqueous solution but not by the presence of the viscosifying agent. The DIAMOND SEAL polymer exhibited no swelling in the 33 wt. % $CaCl_2$ solution, whereas it exhibited a significant amount of swelling by the saturated NaCl solution. Further, the 3 wt. % $CaCl_2$ solution caused the DIAMOND SEAL polymer to swell as much as did the 37 wt. % $CaCl_2$ solution, suggesting that the swelling rate has a significantly higher sensitivity to divalent cations.

Example 2

The DIAMOND SEAL particles of Samples 3 and 4, which had been swollen in the saturated NaCl solution and the 33 wt. % $CaCl_2$ solution in Example 1 respectively, were rinsed with fresh water and then stored in fresh water. Thus, the particles that were swollen less than their full capacity due to the high salt content of the aqueous solutions in Example 1 were swollen further using fresh water. As shown in Table 2 below, Samples 3 and 4 were observed to determine the water absorption rates of the particles therein.

TABLE 2

| Time (hrs.) | Absorption by Sample 3 (g solution/g DS) | Absorption by Sample 4 (g solution/g DS) |
|---|---|---|
| 2.5 | 4 | 33 |
| 3.0 | 6 | 54 |
| 5.25 | 8 | 86 |

The results illustrate that the swelling rate of the DIAMOND SEAL particles previously soaked in the $CaCl_2$ solution was significantly higher than that of the particles previously soaked in the NaCl solution. Therefore, the DIAMOND SEAL particles can be placed deep in a permeable zone of a subterranean formation using a highly concentrated $CaCl_2$ solution, followed by completing the swelling process in situ using a fresh water sweep of the permeable zone.

Example 3

Several test samples were formed by mixing the DIAMOND SEAL polymer with the following aqueous solutions containing 8.42 wt. % sodium silicate having a sodium oxide to silicon dioxide ratio of 3:1: fresh water (Sample 1); a fresh water solution containing 0.5 wt. % HEC per total weight of the solution (Sample 2); a NaCl solution containing 0.5 wt. % HEC and 2 wt. % NaCl per total weight of the solution (Sample 3); a NaCl solution containing 0.5 wt. % HEC and 6 wt. % NaCl per total weight of the solution (Sample 4). The HEC used in this example was a Halliburton product known as FWCA. For each test sample, the grams of aqueous solution absorbed per gram of DIAMOND SEAL polymer were determined after different intervals of time. As such, the rates of water absorption exhibited by the DIAMOND SEAL polymer in different solutions containing sodium silicate could be compared, as shown in Table 3 below.

TABLE 3

| Time (hrs.) | Absorption by Sample 1 (g solution/ g DS) | Absorption by Sample 2 (g solution/ g DS) | Absorption by Sample 3 (g solution/g DS) | Absorption by Sample 4 (g solution/g DS |
|---|---|---|---|---|
| 0.5 | 8 |  | 7 | 5 |
| 1.0 |  | 19 |  | 7 |
| 1.5 | 21 | 25 | 15 |  |
| 3.0 | 25 | 31 | 24 | 19 |
| 5.0 |  |  |  | 25 |

TABLE 3-continued

| Time (hrs.) | Absorption by Sample 1 (g solution/ g DS) | Absorption by Sample 2 (g solution/ g DS) | Absorption by Sample 3 (g solution/g DS) | Absorption by Sample 4 (g solution/g DS |
|---|---|---|---|---|
| 5.5 |  |  |  | 30 |
| 6.5 | 32 | 37 |  |  |
| 24 | 50 | 49 | 55 | 37 |

Based on these results, sodium silicate affects the swelling rate of the DIAMOND SEAL polymer in the same manner as other sodium salts such as NaCl. That is, the DIAMOND SEAL polymer in a sodium silicate solution absorbs less water than that in a fresh water solution. While the presence of the HES viscosifier did not affect the water uptake, the addition of sodium silicate further reduced the amount of water absorbed by the DIAMOND SEAL polymer. Therefore, a sodium silicate aqueous solution may be used as a carrier fluid to place the DIAMOND SEAL polymer in a permeable zone without significantly swelling the polymer.

Example 4

Additional test samples were prepared by mixing the DIAMOND SEAL polymer with the following aqueous solutions containing 8.42 wt. % sodium silicate and the following gelling agents, respectively: fresh water and sodium acid pyrophosphate (available from Halliburton as MF-1) gelling agent (200 lbs/M gal)(Sample 1); a fresh water solution containing 0.5 wt. % HEC per total weight of the solution and MF-1 gelling agent (200 lbs/M gal) (Sample 2); a fresh water solution containing 0.5 wt. % HEC per total weight of the solution and MF-1 gelling agent (100 lbs/M gal) (Sample 3); a fresh water solution containing 0.5 wt. % HEC per total weight of the solution and MF-1 gelling agent (50 lbs/M gal) (Sample 4); fresh water solution containing 0.5 wt. % HEC per total weight of the solution and urea as the gelling agent (200 lbs/M gal) (Sample 5); NaCl solution containing 0.5 wt. % HEC and 5 wt. % NaCl per total weight of the solution and urea as the gelling agent (200 lbs/M gal) (Sample 6). For each test sample, the rates of water absorption exhibited by the DIAMOND SEAL polymer and the gel times of the sodium silicate were determined, as shown in Table 4 below.

TABLE 4

|  | Sample 1 | Sample 2 | Sample 3 | Sample 4 | Sample 5 | Sample 6 |
|---|---|---|---|---|---|---|
| Absorption at 2.5 hrs. (g solution/g DS) | 26 | Note 1 | 25 | 31 |  |  |
| Absorption at 5.0 hrs. (g solution/g DS) |  |  | 37 | 46 | 33 | 31 |
| Gel Time at 160° F. (hrs.) | <0.5 | Note 1 | 5.5 | 10 | No indication of gelation in 24 hrs. | Gel precipitation began at 24 hrs. |

Note 1:
Instantaneous formation of gel chunks upon contact. Leaving the absorbent material also caused chunky gel formation, indicating that the high level of gelling agent caused instantaneous gelation of sodium silicate.

Based on these results, the test samples containing different amounts of MF-1 gelling agent and those containing urea as the gelling agent exhibited similar absorption rates. The gelling time of the sodium silicate in the NaCl solution containing urea as the gelling agent was much longer that the gelling times of the sodium silicate in the fresh water solutions containing the MF-1 gelling agent. The sodium silicate in the fresh water solution containing urea undesirably exhibited no gelation after 24 hours. Gelation of the sodium silicate in Samples 1–4 strengthened the DIAMOND SEAL polymer by depositing the silica particles inside the swollen particles. As expected, incorporating the gelled sodium silicate in the DIAMOND SEAL polymer improved the polymer's resistance to deformation, as indicated by its good rubbery feel. It also resulted in the formation of a cohesive mass having good interparticle adhesion, which is expected to provide good adhesion to the surfaces of a sandstone formation and to improve the fracture gradient of the formation.

Example 5

The DIAMOND SEAL polymer was ground and separated into different size fractions by sieving using different mesh sizes. As shown in Table 5 below, the different fractions of the DIAMOND SEAL polymer were then placed in fresh water to determine the effects of particle size on the water absorption rate of the DIAMOND SEAL polymer.

TABLE 5

| Time (hrs.) | Absorption by the DS Particles Retained by #6 (g fresh water/g DS) | Absorption by the DS Particles Using a 6/8 Mesh (g fresh water/g DS) | Absorption by the DS Particles Using a 8/10 Mesh (g fresh water/g DS) | Absorption by the DS Particles Using a 10/20 Mesh (g fresh water/g DS) | Absorption by the DS Particles Passed Through #20 (g fresh water/g DS) |
|---|---|---|---|---|---|
| 0.5 | 17 | 22 | 35 | 59 | 100 |
| 1.1 | 36 | 53 | 78 | 118 | 175 |
| 2.0 | 70 | 89 | 119 | 146 | 184 |
| 2.4 | 170 | 167 | 167 | 174 | 185 |

The results show that the water absorption rates of the DIAMOND SEAL polymer are strongly affected by its particle size, with the smallest particles showing the fastest absorption rate. Thus, the particle size distribution can be selected based on the sizes and the depths of the permeable zones in a particular subterranean formation.

While the preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Accordingly, the scope of protection is not limited by the description set out above, but is only limited by the claims which follow, that scope including all equivalents of the subject matter of the claims. Each and every claim is incorporated into the specification as an embodiment of the present invention. Thus the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of cementing a wellbore in a subterranean formation, comprising:
   completing drilling of the wellbore;
   subsequently passing a swelling agent to a permeable zone in the subterranean formation, wherein the swelling agent contacts an aqueous fluid, causing the swelling agent to swell in the permeable zone; and
   pumping a cement slurry into the subterranean formation, wherein the swelling agent substantially inhibits the cement slurry from passing through the permeable zone.

2. The method of claim 1 wherein the swelling agent is selected from the group consisting of crosslinked polyacrylamide, crosslinked polyacrylate, copolymers of acrylamide and acrylate monomers, a starch backbone grafted with acrylonitrile and acrylate, polymers of two or more of allylsulfonate, 2-acrylamido-2-methyl-1-propanesulfonic acid, 3-allyloxy-2-hydroxy-1-propane-sulfonic acid, acrylamide, and acrylic acid monomers, and combinations thereof.

3. The method of claim 1 wherein the swelling agent is selected from the group consisting of hydrolyzed polyacrylonitrile, carboxyalkyl cellulose, carboxyalkyl starch, salts of carboxyalkyl cellulose, carboxyalkyl polysaccharide, and combinations thereof.

4. The method of claim 1 wherein the swelling agent comprises a blend of two or more materials having different rates of water absorption.

5. The method of claim 1 wherein the swelling agent comprises particles having different sizes.

6. The method of claim 1 wherein the aqueous fluid is fresh water produced by the subterranean formation.

7. The method of claim 1, further comprising combining the swelling agent with a carrier fluid prior to said passing the swelling agent to the permeable zone.

8. The method of claim 7 wherein the aqueous fluid is pumped into the subterranean formation subsequent to said passing the swelling agent and the carrier fluid into the subterranean formation.

9. The method of claim 8 wherein the aqueous fluid is fresh water.

10. The method of claim 9 wherein the carrier fluid comprises at least one of a non-aqueous solution and a metal salt aqueous solution.

11. The method of claim 10 wherein a metal salt is present in the aqueous solution in an amount greater than about 1 weight % per total weight of the aqueous solution.

12. The method of claim 11 wherein the metal salt aqueous solution is saturated.

13. The method of claim 10 wherein the metal salt aqueous solution comprises at least one of an alkaline earth metal salt and an alkali metal salt.

14. The method of claim 10 wherein the metal salt aqueous solution comprises at least one of a NaCl aqueous solution, a KCl aqueous solution, and a $CaCl_2$ aqueous solution.

15. The method of claim 7 wherein the swelling agent is present a composition comprising the swelling agent and the carrier fluid in an amount ranging from about 0.5% to about 25% by weight of the composition.

16. The method of claim 7 wherein the swelling agent is present a composition comprising the swelling agent and the carrier fluid in an amount ranging from about 1% to about 10% by weight of the composition.

17. The method of claim 1 wherein the cement slurry is pumped into the subterranean formation during a primary cementing process.

18. The method of claim 7, further comprising combining a silicate solution with the swelling agent prior to said passing the swelling agent to the permeable zone, the silicate solution comprising sodium silicate, potassium silicate, or both, and wherein the silicate solution is the in carrier fluid or is in addition to the carrier fluid.

19. The method of claim 18, further comprising combining the silicate solution with a gelling agent to cause it to gel.

20. The method of claim 18, further comprising contacting the silicate solution with an aqueous calcium salt solution subsequent to placing the silicate solution containing the swelling agent in the permeable zone, thereby forming an insoluble calcium silicate barrier in the permeable zone.

21. The method of claim 18 wherein the cement slurry, which comprises calcium, contacts the silicate solution subsequent to placing the silicate solution containing the swelling agent in the permeable zone, thereby forming an insoluble calcium silicate barrier in the permeable zone.

22. The method of claim 19 wherein the gelling agent comprises at least one of an acid, an acid producing chemical, and a hydrogen ion producing chemical.

23. The method of claim 19 wherein the gelling agent comprises at least one of (a) esters and lactones capable of undergoing hydrolysis in the presence of the silicate solution, (b) amides, and (c) a mixture of a reducing agent and an oxidizing agent capable of undergoing an oxidation-reduction reaction in the presence of the sodium silicate solution.

24. The method of claim 18 wherein the silicate solution is produced from a silicate powder comprising a mixture of sodium silicate and potassium silicate.

25. The method of claim 24 wherein the molar ratio of silicon dioxide to sodium oxide in the sodium silicate is in the range of from about 1.5:1 to about 3.3:1.

26. The method of claim 25 wherein the molar ratio of silicon dioxide to potassium oxide in the potassium silicate is in the range of from about 1.5:1 to about 3.3:1.

27. The method of claim 26 wherein the silicate powder has a water content in the range of from about 14% to about 16% by weight of hydrated silicate.

* * * * *